US007562292B2

(12) United States Patent
Mashni et al.

(10) Patent No.: US 7,562,292 B2
(45) Date of Patent: Jul. 14, 2009

(54) SYSTEMS ENGINEERING DOCUMENT PROTOTYPING SYSTEM, PROGRAM PRODUCT, AND RELATED METHODS

(75) Inventors: Jeries G. Mashni, Fort Worth, TX (US); James M. Phillips, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 72 days.

(21) Appl. No.: 11/020,610

(22) Filed: Dec. 22, 2004

(65) Prior Publication Data
US 2005/0160070 A1 Jul. 21, 2005

Related U.S. Application Data

(60) Provisional application No. 60/533,120, filed on Dec. 30, 2003.

(51) Int. Cl.
*G06F 17/00* (2006.01)
(52) U.S. Cl. .................. 715/234; 715/200; 715/201; 715/202; 715/203; 715/204; 715/231; 715/235; 715/236; 715/237; 715/238; 715/239; 715/240; 715/241; 715/242; 715/255
(58) Field of Classification Search .............. 715/500.1, 715/513, 530, 531, 200–204, 234–242, 231, 715/255
See application file for complete search history.

(56) References Cited

U.S. PATENT DOCUMENTS 5,933,841 A * 8/1999 Schumacher et al. ...... 715/501.1
6,003,048 A * 12/1999 Fallside ...................... 715/513
6,065,026 A * 5/2000 Cornelia et al. ............. 715/531
6,202,072 B1 * 3/2001 Kuwahara ................... 715/513

OTHER PUBLICATIONS

Microsoft® Outlook™ 2003: Quick Reference Guide, 2003, pp. 1-10, Nevada Learning Series Inc. and graphical user interface pages (See Particularly pp. 1-4 and 8-10).

* cited by examiner

*Primary Examiner*—Stephen S Hong
*Assistant Examiner*—David Faber
(74) *Attorney, Agent, or Firm*—Bracewell & Giuliani LLP

(57) ABSTRACT

A document prototyping system, program product, and methods are provided to create a systems engineering prototype document. The system can include a database having a plurality of systems engineering document templates stored therein. Each of the plurality of systems engineering document templates includes a plurality of document sections. The system can also include user interface in communication with the database to provide access to the database by a user, a document browser in communication with the database and the user interface to browse the plurality of systems engineering document templates through the user interface, a document section selector in communication with the user interface to select a subset of the plurality of document sections from the plurality of systems engineering document templates responsive to the user, and a document section merger responsive to the document section selector to merge the selected sections into a new systems engineering prototype document having the subset of the plurality of document sections to thereby define a new systems engineering prototype document format.

11 Claims, 16 Drawing Sheets

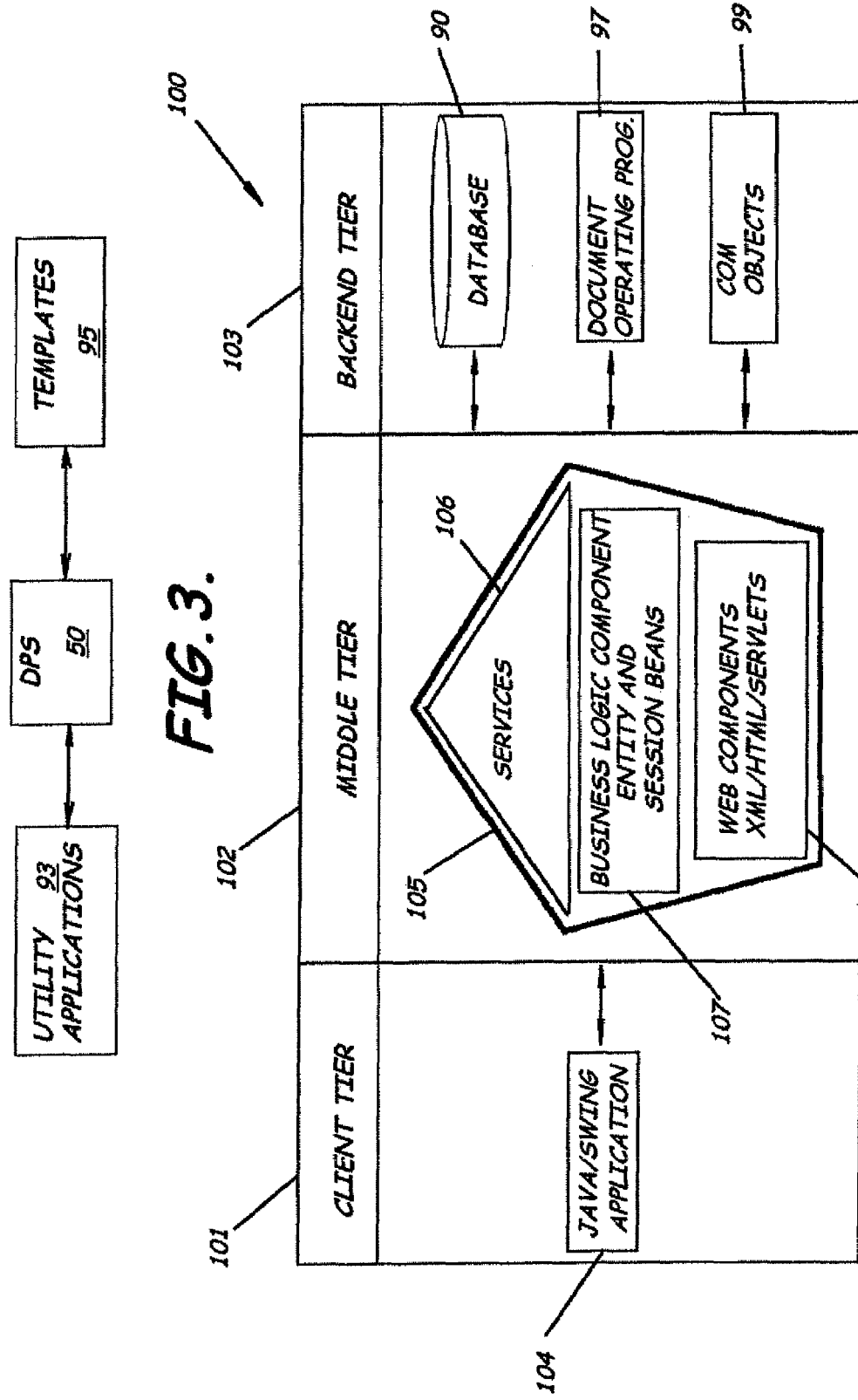

SYSTEMS ENGINEERING DOCUMENT PROTOTYPING SYSTEM, PROGRAM PRODUCT, AND RELATED METHODS

RELATED APPLICATIONS

This application is related to and claims priority and benefit of U.S. Provisional Patent Application Ser. No. 60/533,120, filed Dec. 30, 2003, titled "Systems Engineering Document Prototyping System, Software, and Related Methods," which is incorporated herein by reference in its entirety.

BACKGROUND OF THE INVENTION

1. Field of the Invention

This invention relates to industrial planning and, more particularly, to systems engineering document processing systems, program products, and methods.

2. Description of Related Art

In the systems engineering industry, document production, handling and processing, such as specifications, proposals, document publishing, document part sharing, and other system engineering documents, can be time consuming and burdensome and can have some unique needs. As competition has increased over the years, the need for quick turn around times on meeting deadlines, preparing proposals, and providing customers efficient and high quality services has increased. Manually going through prior proposals and using various experts in the related fields to assimilate, comment, revise, and produce document prototypes of proposals, specifications, and other systems engineering documents can be time consuming and expensive.

Software has been developed over the years to convert word processing or plain text documents into standard generalized markup language (SGML) documents when the form is not fixed and more recently when the form is fixed such as a form paper to enhance the workability of the document. Nevertheless, converting a plain text document to SGML format provides little or no user capabilities to use the document for document prototyping purposes.

SUMMARY OF THE INVENTION

In view of the foregoing, Applicants have recognized a need for a system, program product or software, and methods of enhanced rapid document prototyping and development for systems engineering and other applications that provides a source of historical data for such applications and easy controlled access to multiple users when drafting and revising a proposed prototype document. Embodiments of the present invention advantageously provide a system, program product or software, and methods to significantly enhance rapid prototyping and development of specifications, proposals, and systems engineering documents. Embodiments of the present invention additionally provide a document prototyping and development system that includes a source for historical data and document templates.

Embodiments of the present invention also advantageously provide a system, program product or software, and methods to enhance document developments to be stored and tracked on a common data source and an ability to link and interface to selected product data. Embodiments of the present invention further advantageously provides a system, program product or software, and methods that allow easy controlled access to multiple users when drafting and revising a prototype document. This, for example, can allow multiple users to work on a prototype document simultaneously or substantially simultaneously and yet be restricted to only selected sections of a document. Embodiments of the present invention still further provide a system, program product or software, and methods to reduce the time and cost associated with document production, handling, and processing.

More particularly, embodiments of the present invention provide a document prototyping system to create a systems engineering prototype document. The system includes a first document converter positioned to convert a plurality of documents each having a predetermined format, e.g., a word processing document format, into a plurality of documents each having a standard generalized marking language (SGML) format, a document parser positioned to parse the plurality of documents each having the SGML format into a plurality of document templates each having a preselected document format and a plurality of document sections, and a database having the plurality of document templates stored therein. The system also includes a user interface in communication with the database to provide access to the database by a user, a document browser in communication with the database and the user interface to browse the plurality of systems engineering document templates through the user interface, a document section selector in communication with the user interface to select a subset of the plurality of document sections from the plurality of systems engineering document templates responsive to the user, and a document section merger responsive to the document section selector to merge the selected sections into a new systems engineering prototype document having the subset of the plurality of document sections to thereby define a new systems engineering prototype document format. The system can also include a second document converter responsive to the document section merger to convert the new document into a reformatted document. The reformatted document, for example, can have the predetermined format, e.g., the word processing document format.

Another embodiment of the present invention provides a document prototyping system to create a prototype document including a first client computer having a first memory and a first client interface associated therewith, a first communication network in communication with the first client computer, a second services computer in communication with the first client computer through the first communication network, having a second memory associated therewith, and defining a services server, and a second communication network also in communication with the services server and being a different communication network than the first communication network. The system also has a database in communication with the services server through the second communication network and having a plurality of document templates stored therein. Each of the plurality of system engineer document templates includes a plurality of document sections. The system additionally has a user interface in communication with the services server through the second communication network to provide access to the database by a user, and document prototyping program product or software stored in the second memory of the services server to allow the user to prototype documents through the user interface. The document prototyping software includes a document browser in communication with the database and the user interface to browse the plurality of system engineer document templates through the user interface, a document section selector in communication with the user interface to select a subset of the plurality of document sections from the plurality of system engineer document templates responsive to the user, and a document section merger responsive to the document section selector to merge the selected sections into a new system engineer prototype document having the subset of the plurality of document sections to thereby define a new system engineer prototype document format.

Embodiments of the present invention additionally provide a computer-readable recording medium storing therein a systems engineering document prototyping program to allow a user to prototype documents. Examples of computer readable media, as understood by those skilled in the art, include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. The systems engineering document prototyping program includes a document browser adapted to browse, through a user interface, a plurality of systems engineering document templates stored in a database. Each of the plurality of systems engineering document templates includes a plurality of document sections. The program also includes a document section selector adapted to select a subset of the plurality of document sections from the plurality of systems engineering document templates in the database responsive to a user using the user interface and a document section merger responsive to the document section selector to merge the selected sections into a new systems engineering prototype document having the subset of the plurality of document sections to thereby define a new systems engineering prototype document format.

Embodiments of the present invention also advantageously provides a method of creating a systems engineering prototype document which includes the steps of adding a plurality of original systems engineering document templates each having a plurality of document sections to a database, browsing the plurality of systems engineering templates stored in the database, and selecting a subset of the plurality of document sections from the plurality of systems engineering templates stored in the database responsive to a user desired out of a prototype document to form a new systems engineering prototype document having the subset of document sections to thereby define a new systems engineering prototype document format.

Embodiments of a system, program product or software, and methods of the present invention advantageously provide a solid development system through an internet or web-based tool to allow quick prototyping of documents and yet have an easy interface between a requirements management tool and word processing and presentation software.

BRIEF DESCRIPTION OF THE DRAWINGS

Some of the features and advantages of the present invention having been stated, others will become apparent as the description proceeds when taken in conjunction with the accompanying drawings, in which:

FIG. 3 is a schematic diagram of document prototyping software having components of utility applications, document prototype software, and document templates of a system to create a system engineering document prototype according to an embodiment of the present invention;

FIG. 4 is a schematic diagram of a system to create a systems engineering document prototype having a client tier, a middle/server tier, and a back end tier according to an embodiment of the present invention;

DETAILED DESCRIPTION

Figure 1:
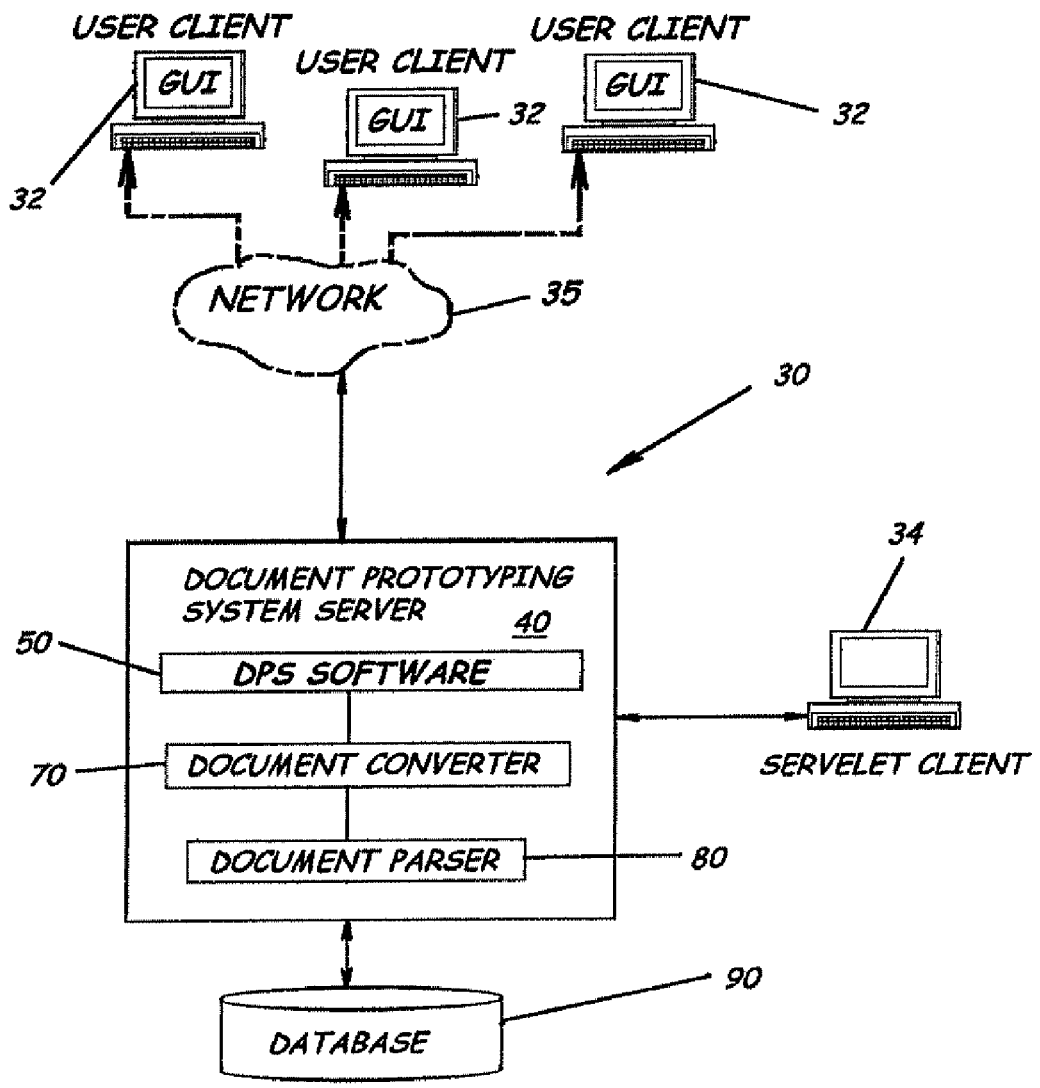
FIG. 1 is a schematic diagram of a system to create a systems engineering document prototype according to an embodiment of the present invention.

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

FIGS. 1-5 illustrate an embodiment of a document prototyping system 30 to create a systems engineering prototype document. An embodiment of the system 30, for example, includes at least a first remote client computer 32, or a plurality of client computers 32, having a first memory and a first client interface associated therewith, as understood by those skilled in the art. The client computers 32 are adapted to be in communication with a first communication network 35, such as the Internet, one or more dedicated communication links, or other communication network, and a second services computer in communication with the first client computer 32 through the first communication network 35, having a second memory associated therewith, and defining a services server 40 as understood by those skilled in the art. The client computer 32, for example, can use a graphical user interface ("GUI"), e.g., see FIGS. 2 and 8-22, to communicate to the server 40 using a hyper-text transfer protocol ("HTTP") as also understood by those skilled in the art.

Figure 5:
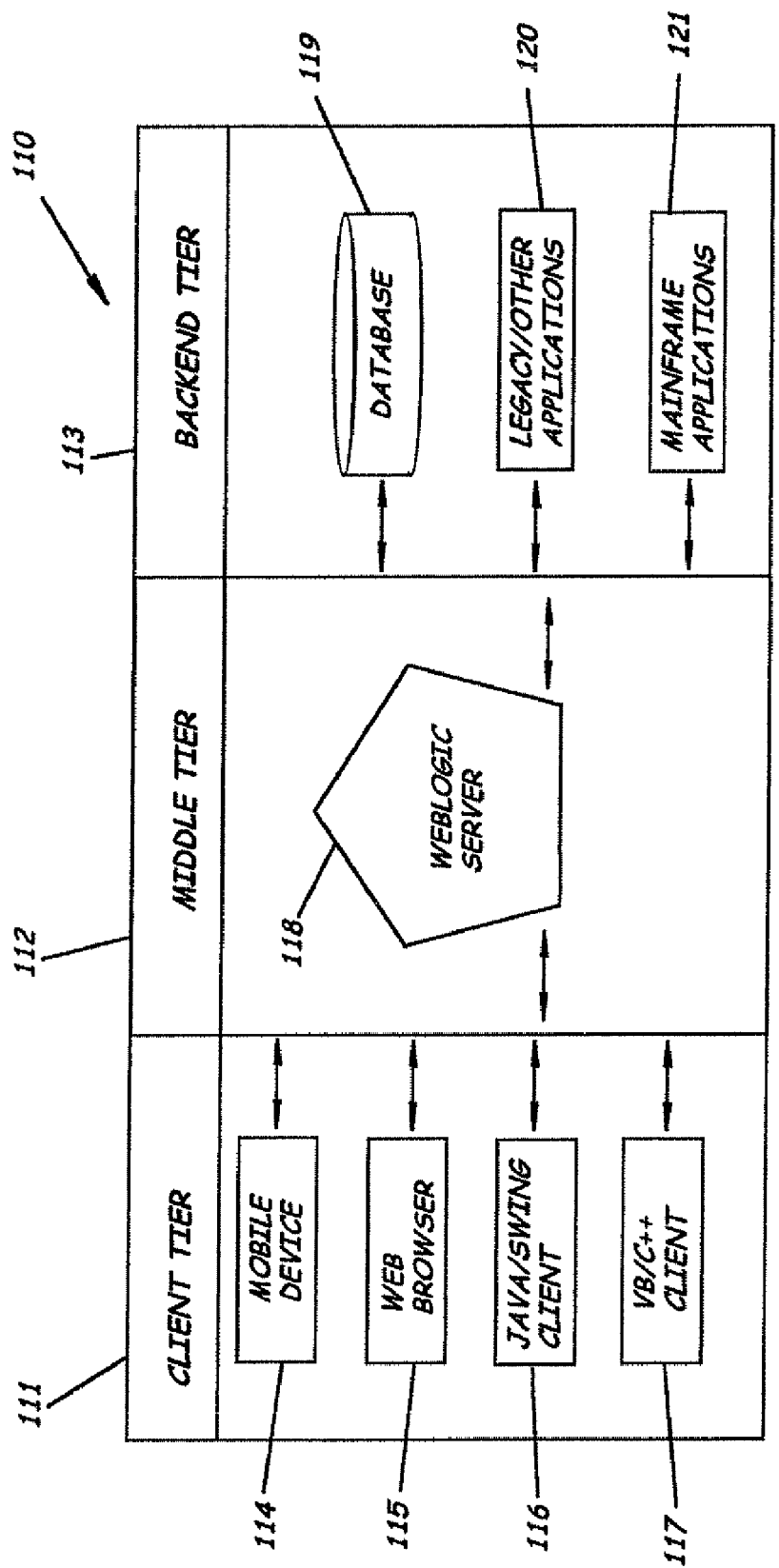
FIG. 5 is a schematic diagram of a system to create a systems engineering document prototype having a client tier, a middle/server tier, and a back end tier according to an embodiment of the present invention.

The services server 40, e.g., as a middle tier 102, 112, of embodiments of a system 30, 100, 110 has the business logic component entity and session beans 107, e.g., one or more sessions on the system 30, for document prototyping software 50 or program product as described further herein. Embodiments of the services server 40, for example, can be a weblogic server 105, 118 having associated services 106 and web components/XML, HTML, servelets 108, as understood by those skilled in the art, as a middle tier 102, 112, such as a BEA Weblogic server provided by BEA Systems, Inc. of San Jose, Calif. FIGS. 4-5, for example, have been adapted by the Applicants from BEA weblogic server drawings to illustrate the application of embodiments, systems, program products, and methods of the present invention using such a BEA Weblogic server. It will be understood by those skilled in the art that other services servers or weblogic servers can be used as well according to the present invention. As illustrated, the weblogic server 105, 118 can interface on a backend tier 103,113 with a database 90, 119, document operating programs 97 or Legacy/other applications 120, and communication (or "corn") objects 99 and mainframe applications 121 as understood by those skilled in the art.

As illustrated in FIGS. 1-22, embodiments of a system 30, 100, 110 can also include a second communication network, such as an Internet or one or more dedicated links also in communication with the services server 40, 105 and being a different communication network than the first communication network. A database 90, 119 preferably is in communication with or associated with the services server 40 through the second communication network and having a plurality of document templates stored therein. The document prototyping software 50, e.g., through program instructions as understood by those skilled in the art, can store data in and/or add data to the database 90, and the database 90, for example, can by an Oracle relational data base management system ("RDBMS") as understood by those skilled in the art. The system 30 can also include a servelet client computer 34 in communication through a communication link, with the services server 40.

As shown in FIGS. 2-5, for example, the document prototyping software 50 can interface with existing utility application programs 93, such as a JAVA/SWING application 104 or JAVA/SWING client 116 at the client tier 101, 111 as understood by those skilled in the art, in a system 30, 100, 110 or associated with a server 40. The document prototyping software 50 can also interface with one or more document templates 95, i.e., documents having outlines or selected organizational formats (see Template List 172 and Template Tree 174), from the database 90 through use of one or more common web-based languages. For example, there can be many instances of the client computer 32 interacting with the services server 40 at any given time, e.g., simultaneous usage by a plurality of clients or users 32, 34. As described above, the client 32 interacts with the server 40 via the HTTP protocol using a local Internet. All communications between the client (s) 32 and the server 40, for example, can be through extensible markup language ("XML") messages, which advantageously can be uniquely defined for the document prototyping software 50. Alternatively, a mobile device 114, e.g., personal digital assistant ("PDA"), can operate as a client user in a client tier III as understood by those skilled in the art, and/or VB/CH languages 117 can also be used in communication with the server from the client 32 or servelet client 34.

An embodiment of the system 30 as illustrated can also include a user interface 32, e.g., including a filter 51 and a GUI 60 of a client computer 32, (see, e.g., FIG. 2) in communication with the services server 40 through a communication network to provide access to the database 90 by a user and document prototyping software 50 or program product stored in memory of the services server 40 to allow the user to prototype documents through the user interface 32. The document prototyping software 50 stored on the services server 40, as understood by those skilled in the art, can include a file transfer servelet 58, having a file server 59, and a document processor 61. The client computer 32, for example, can download or store a portion of the document processing software 50 or simply access the document prototyping software 50 through the server using its own web browser 115. If a portion of the software 50 is stored on the client user 32, e.g., as an application program, then the document prototyping software 50, for example, can include a document browser 52 in communication with the database 90 and the user interface 60, e.g., as part of the application program interface, to browse the plurality of document templates 95 through the user interface 60.

Each of the plurality of system engineer document templates 95, for example, includes a plurality of document sections 91. A document section selector 56 can be in communication with the user interface 60 to select a subset of the plurality of document sections from the plurality of document templates 53 responsive to the user, and a document section merger 57 can be positioned responsive to the document section selector 56 to merge the selected sections into a new prototype document having the subset of the plurality of document sections to thereby define a new prototype document format. Alternatively, as understood by those skilled in the art, the client computer 32 can have its own software capabilities, such as browsing (web browser) or viewing, sorting, and merging.

Figure 2:
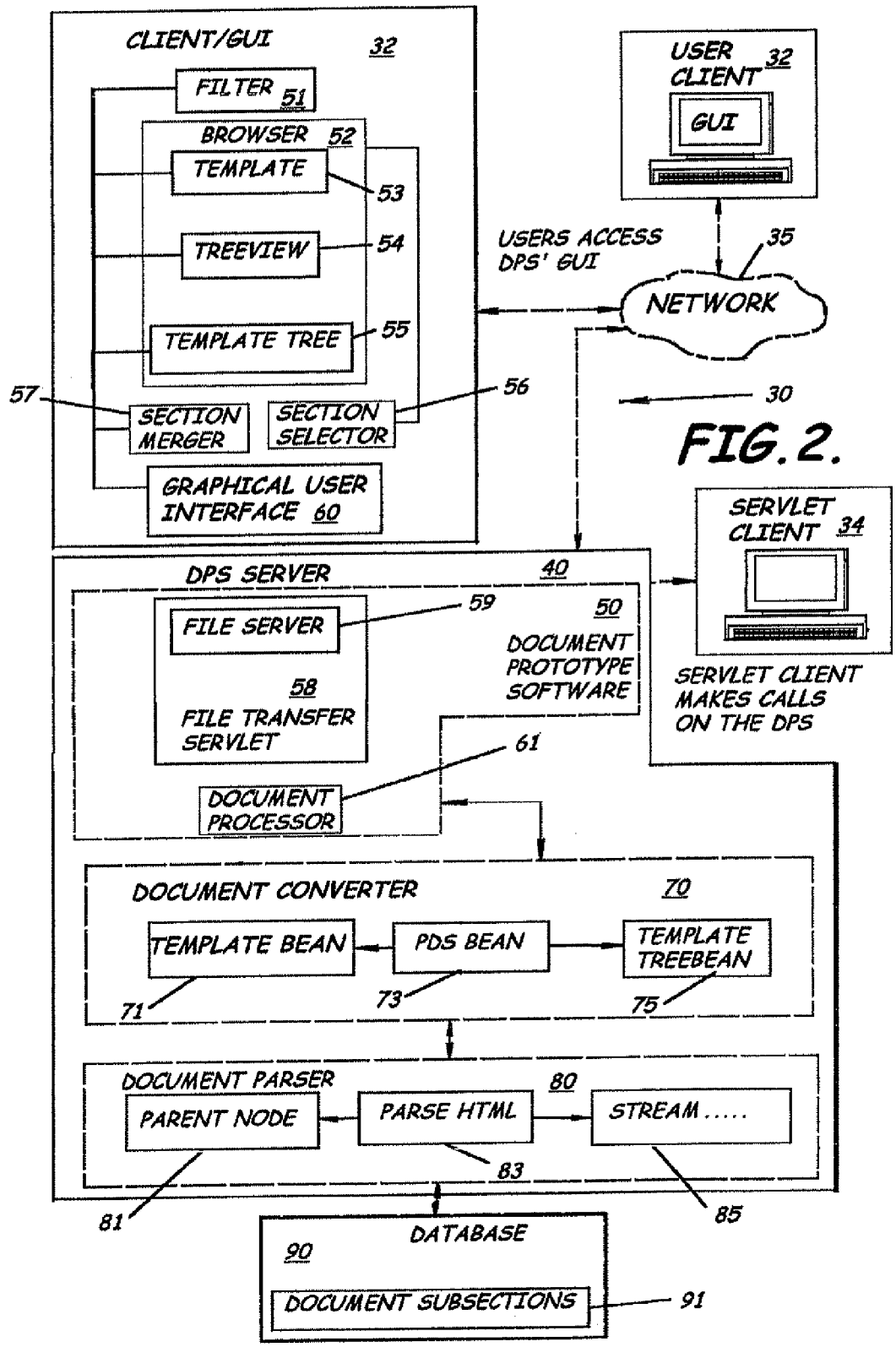
FIG. 2 is a schematic diagram of a system having document prototyping software to create a system engineering document prototype according to an embodiment of the present invention.
Figure 6:
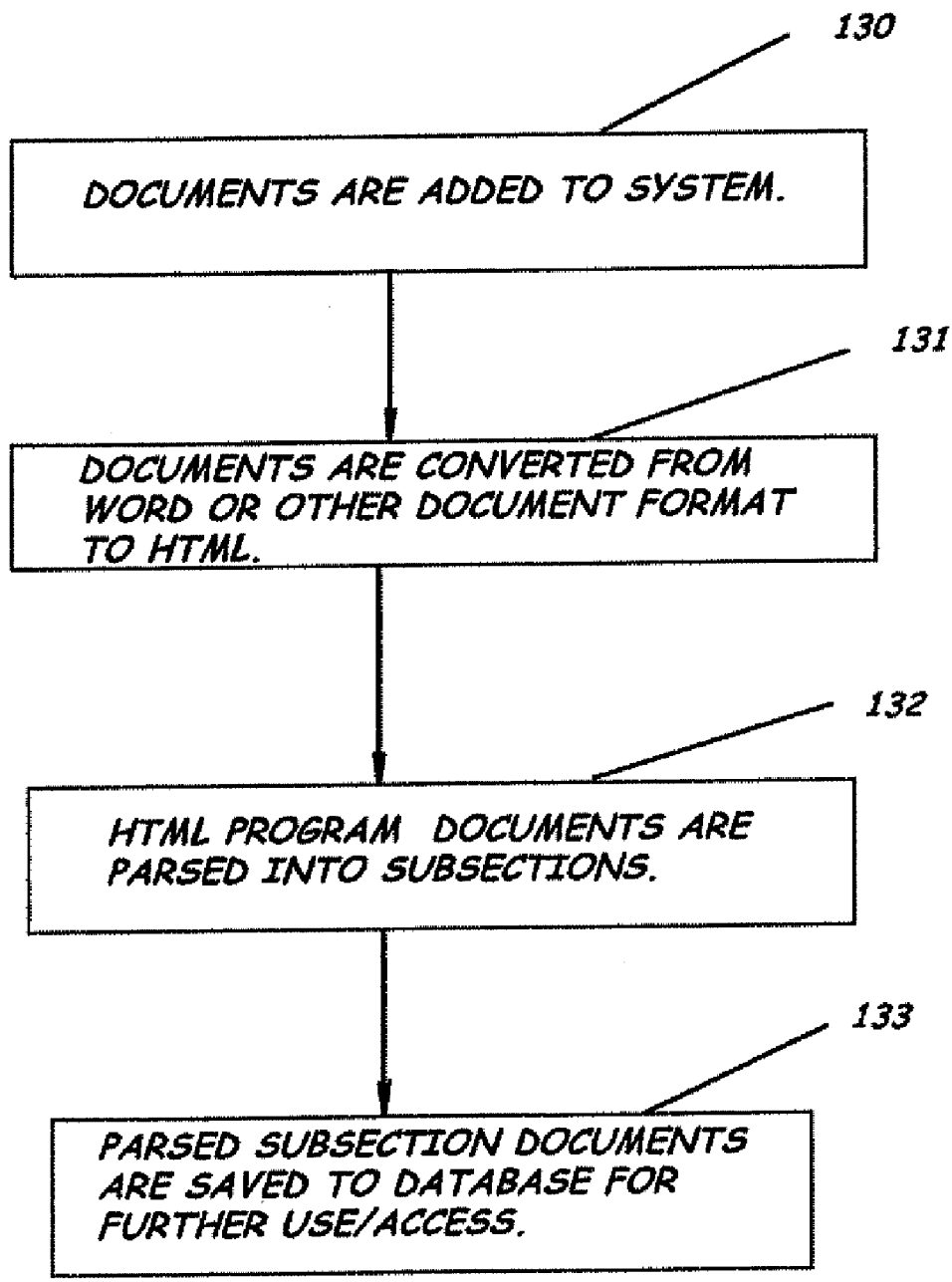
FIG. 6 is a flow diagram of a method of creating a document prototype illustrating portions of adding document templates to a database according to an embodiment of the present invention.
Figure 7:
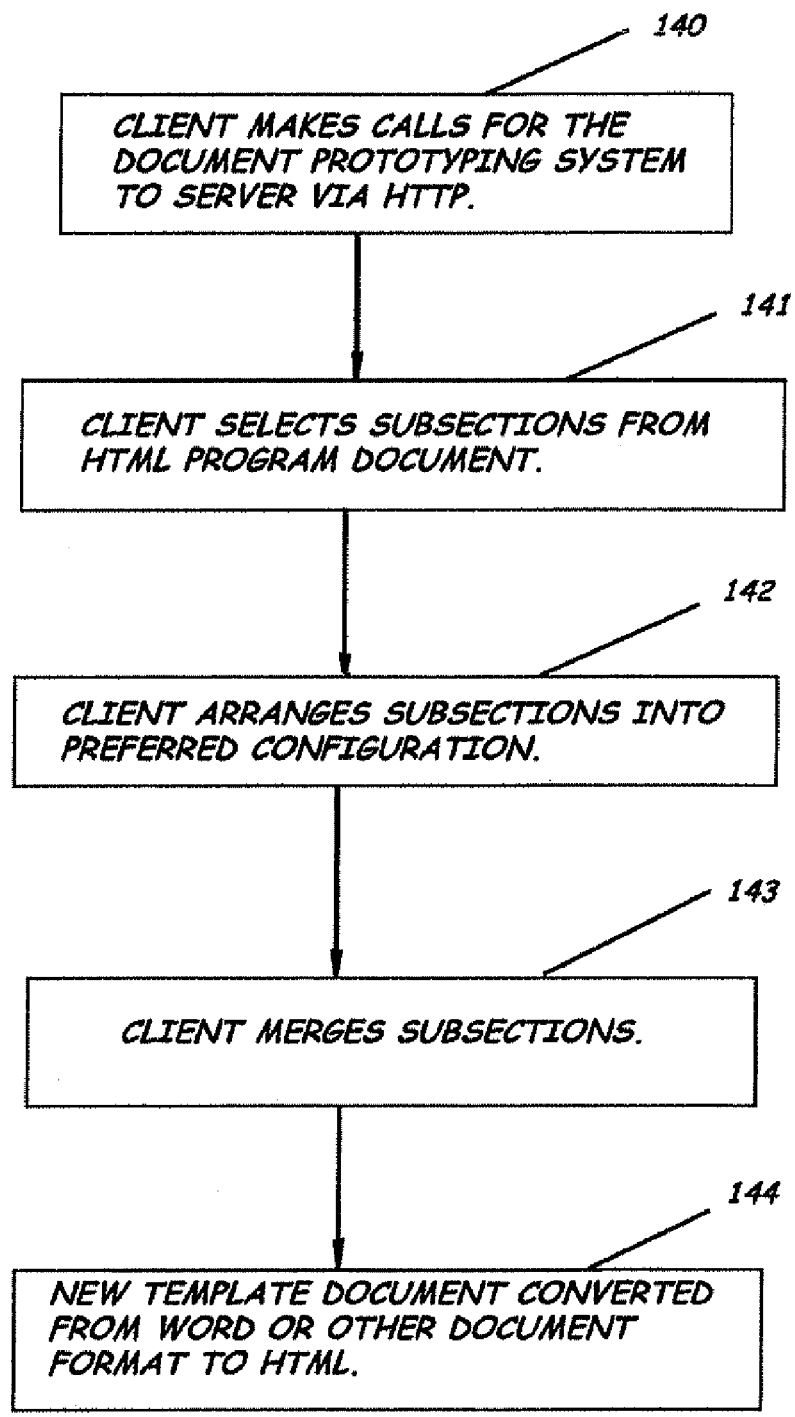
FIG. 7 is a flow diagram of a method of creating a document prototype illustrating portions of browsing templates in a database according to an embodiment of the present invention.
Figure 8:
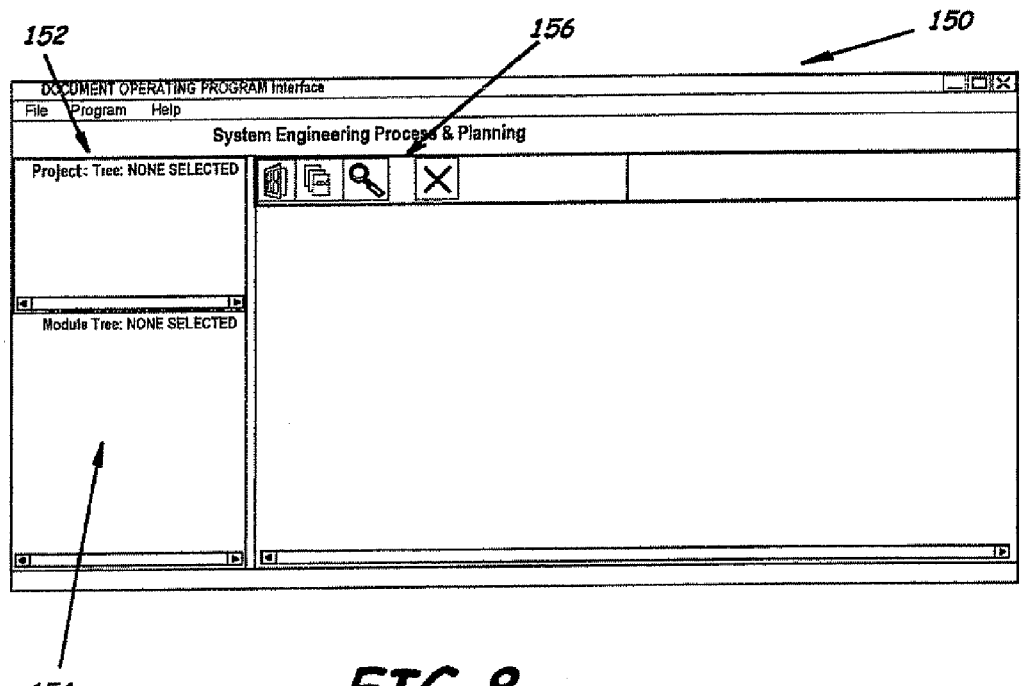
FIG. 8 is a front plan view of a graphical user interface of a system to create a systems engineering document prototype according to an embodiment of the present invention.
Figure 9:
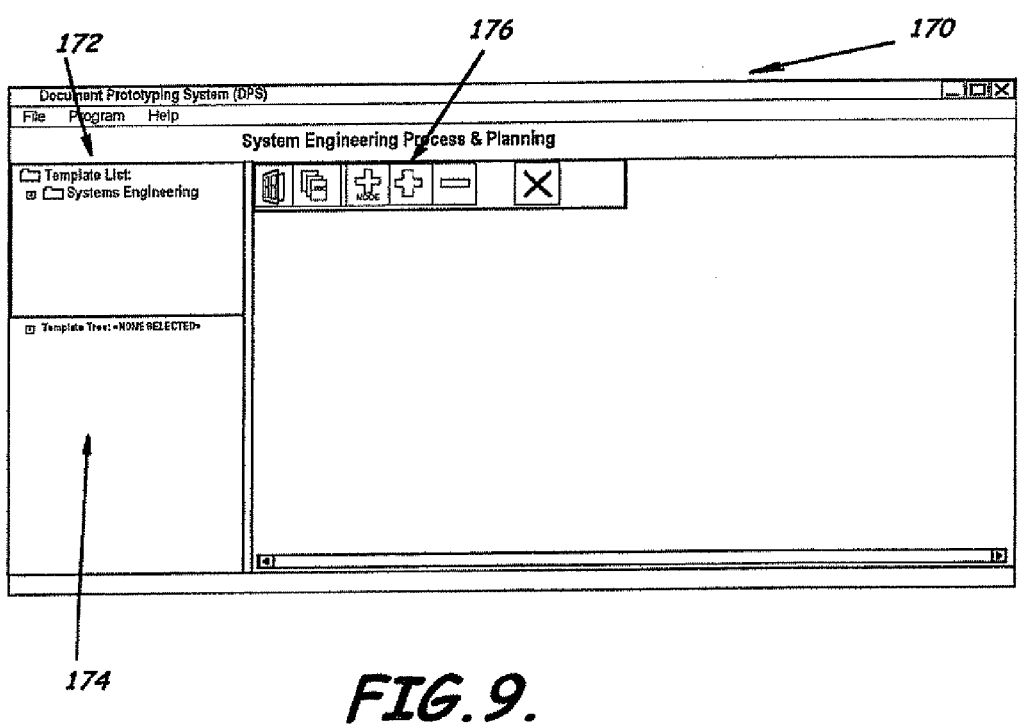
FIG. 9 is a front plan view of a graphical user interface of a system to create a system engineering document prototype according to an embodiment of the present invention.
Figure 10:
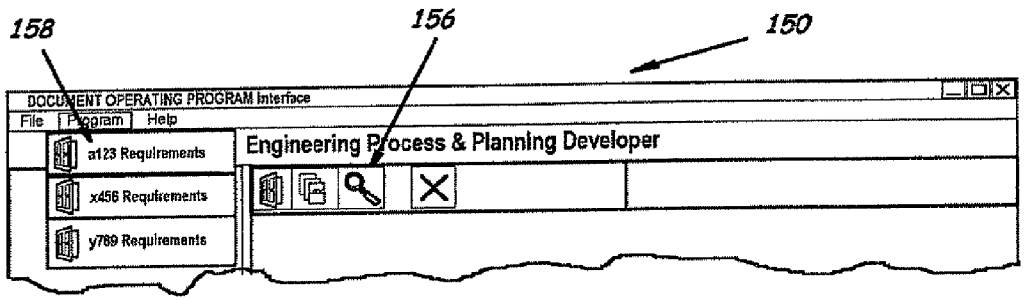
FIG. 10 is a front plan view of a graphical user interface of a system to create a system engineering document prototype according to an embodiment of the present invention.
Figure 11:
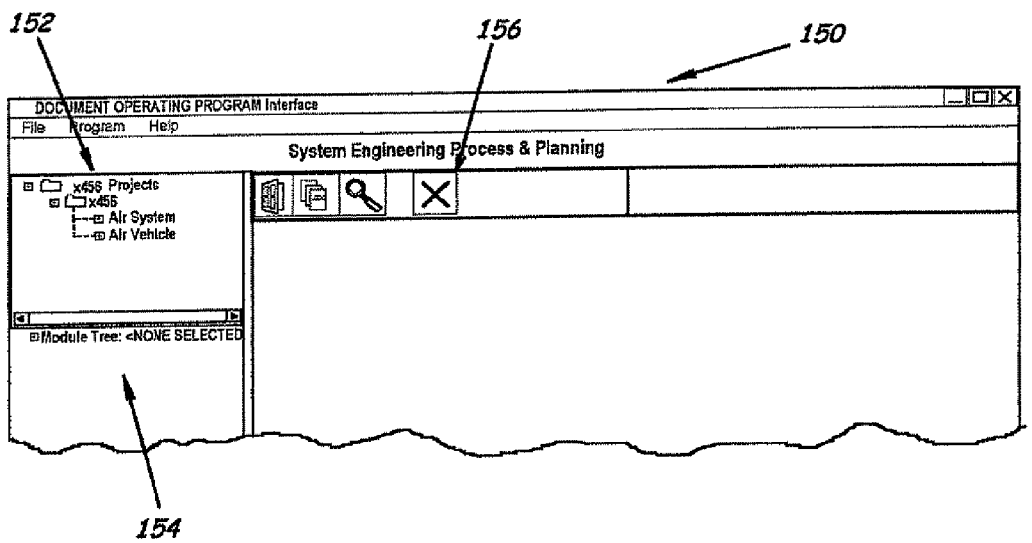
FIG. 11 is a front plan view of a graphical user interface of a system to create a system engineering document prototype according to an embodiment of the present invention.
Figure 12:
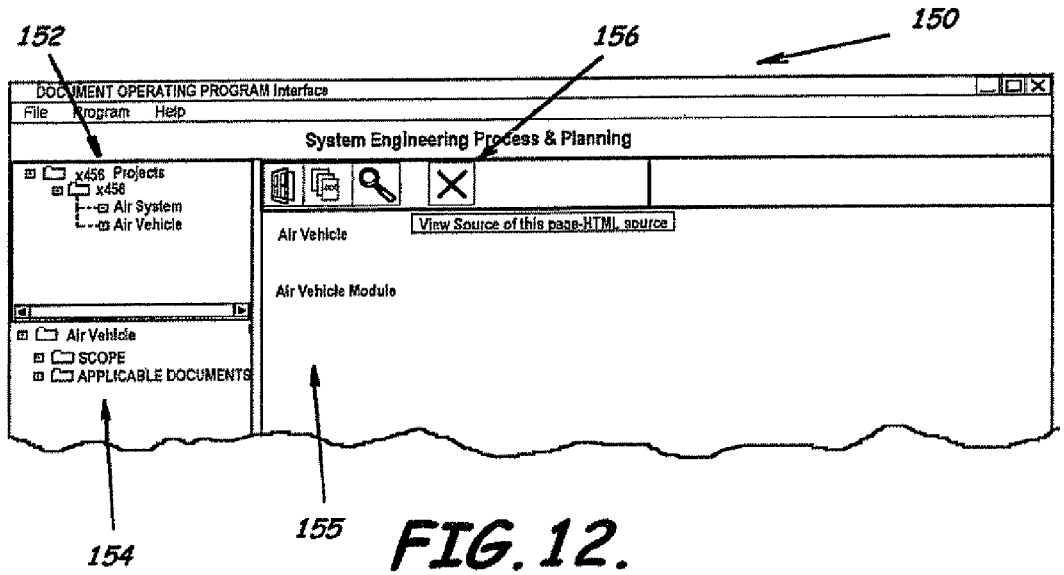
FIG. 12 is a front plan view of a graphical user interface of a system to create a system engineering document prototype according to an embodiment of the present invention.
Figure 13:
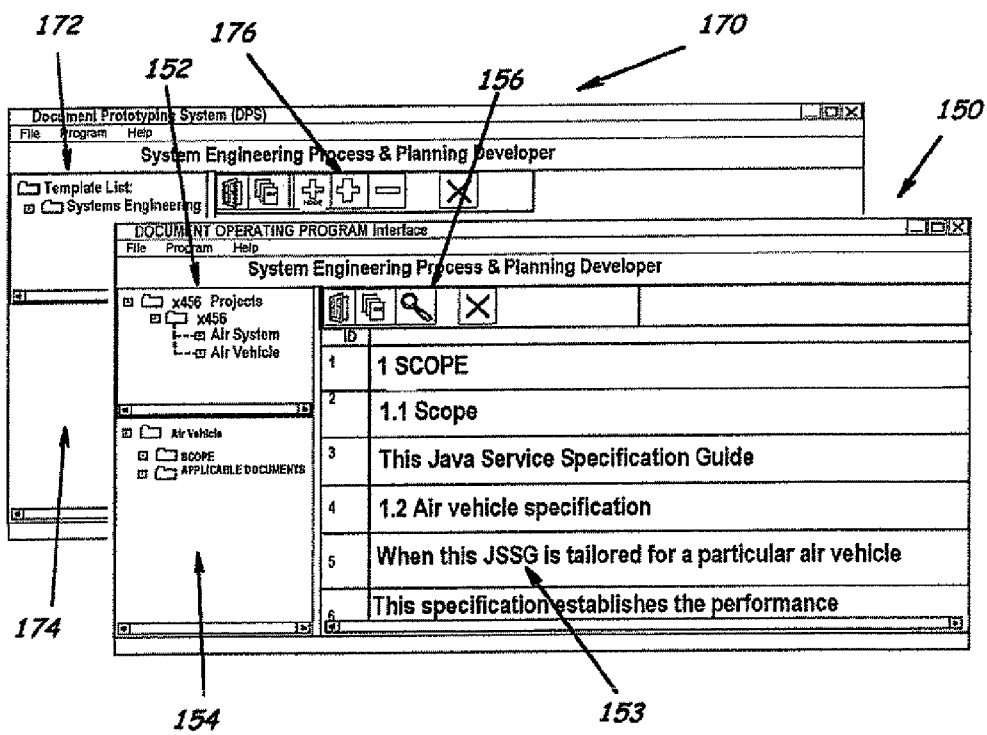
FIG. 13 is a front plan view of a graphical user interface of a system to create a system engineering document prototype according to an embodiment of the present invention.
Figure 14:
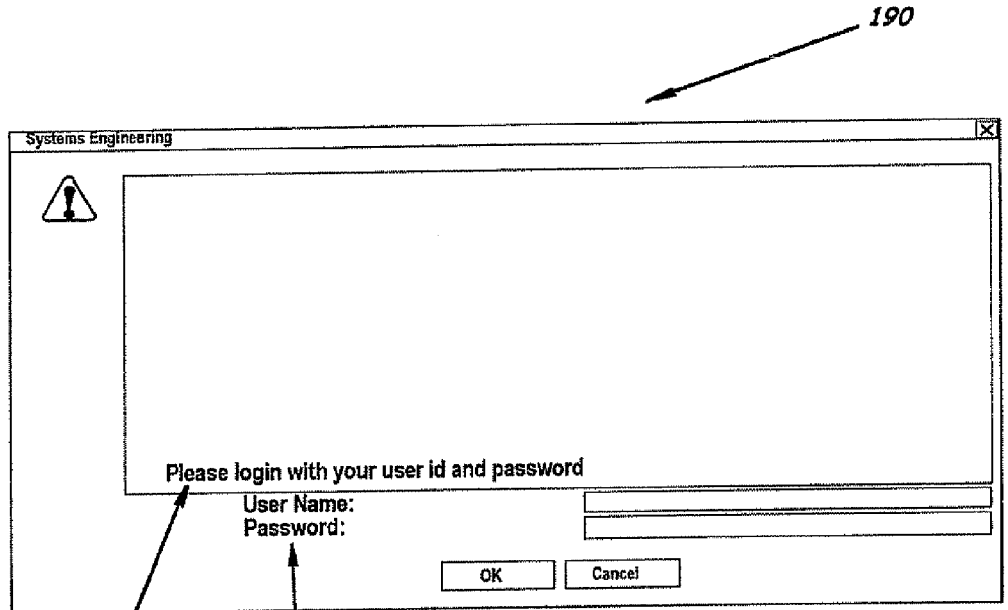
FIG. 14 is a front plan view of a graphical user interface of a system to create a system engineering document prototype according to an embodiment of the present invention.

As shown in FIGS. 2 and 6-7, the document prototyping software or program product 50 allows new documents to be added to the database 90 of the system 30, 100, 110 (see block 130) by converting the documents, e.g., using a document converter 70, from a document word processing software format to an HTML document format (see block 131). The document converter 70, for example, can include a template bean 71, a prototype document software bean 73 and a template treebean as understood by those skilled in the art, to convert from a word processing format to an HTML format having sections thereof. Then, the documents in the database 90 can be browsed by a client user 32 when a document is desired to be developed or created. The document browser 52, for example, can use the graphical user interface 60 to search one or more templates 53, examine a treeview 54 of the templates, e.g., including nodes, and use a template tree 55 to search sections or nodes of a template as understood by those skilled in the art. The document section selector 56, for example, can allow a client user 32 to select through the graphical user interface 60, e.g., an icon, a command to add a section of the templates 53 being browsed to a template format, e.g., to build a new template or to modify an existing selected template. Once a client user 32 determines that this arrangements of sections is what is desired, then the client can select through the graphical user interface 60, a merger 57 or merge command, e.g., an icon, to initiate and complete the merger of sections into a new document.

Additionally, as shown in FIGS. 1-7, an embodiment of the system 30 can include a first document converter 70 positioned to convert a plurality of word processing documents each having a predetermined document format, such as word processing plain text provided by software packages such as Word or WordPerfect as understood by those skilled in the art, into a plurality of documents each having a standard generalized markup language (SGML) format, and a document parser 80 positioned to parse the plurality of documents each having the SGML format into a plurality of systems engineering document templates 95 or 53 each having a preselected systems engineering document format, such as hyper-text markup language ("HTML") as understood by those skilled in the art, and a plurality of document sections (see block 132). The document converter 70, for example, can include a template bean 71, prototype document software (PDS) bean 73, and a template treebean 75, e.g., being one or more sessions on the system engineering prototype system 30, as understood by those skilled in the art, to accomplish the conversion desired. The parser 80, for example, can include a parent node 81, a parse HTML 83 to parse an HTML document, and a stream or stream data 85 to stream or sequence data or instructions during program execution, as understood by those skilled in the art, to accomplish the document parsing into subsections 91. The parsed subsection documents can then be saved to database 90, 119 for further use or access (block 133).

The system 30 also includes a systems engineering document format database 90, 119 positioned to store the plurality of systems engineering document templates therein, a user interface 32, e.g., through a document operating program interface 150, in communication with the systems engineering document format database to provide access to each of the plurality of documents in the database 90, 119 by a user, and document prototyping software 50 in communication with the database 90, 119 and the user interface 32 to create one or more prototype documents. The document prototyping software 50 includes a document browser 52 in communication with the database 90, 119 and the user interface 32, 150, 170 to browse the plurality of systems engineering document templates through the user interface 150, 170, a document section selector 56 in communication with the user interface to select a subset of the plurality of document sections (see, e.g., windows 153, 155 in FIGS. 12-13) from the plurality of systems engineering document templates responsive to the user, and a document section merger 57 responsive to the document section selector 56 to merge the selected sections into a new systems engineering prototype document having the subset of the plurality of document sections to thereby define a new systems engineering prototype document format.

Figure 15:
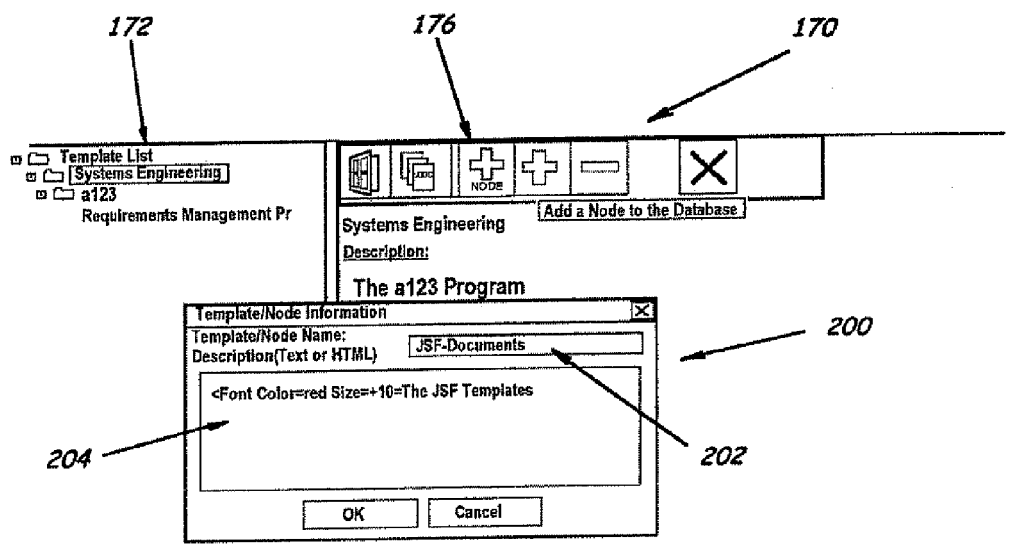
FIG. 15 is a front plan view of a graphical user interface of a system to create a system engineering document prototype according to an embodiment of the present invention.
Figure 16:
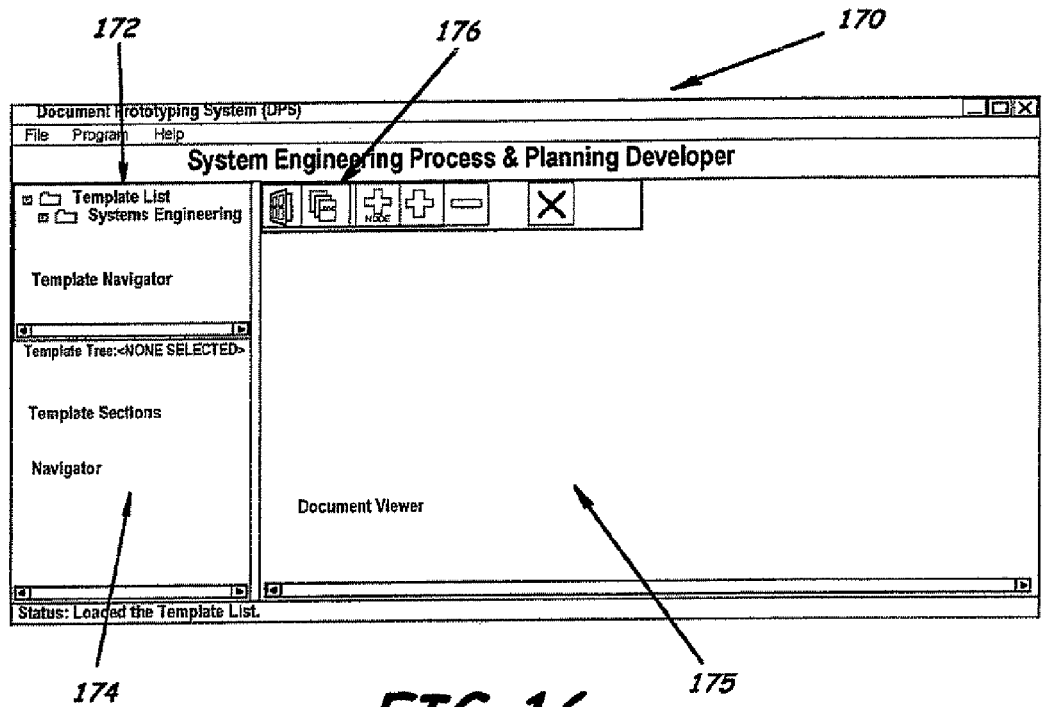
FIG. 16 is a front plan view of a graphical user interface of a system to create a system engineering document prototype according to an embodiment of the present invention.

As illustrated and described herein, embodiments of a system 30, 100, 110 of the present invention advantageously provide a solid development system through an Internet or web-based tool (see, e.g., graphical user interfaces 150, 170, 220, 230 and associated toolbars 156, 176 or icons of FIGS. 8-22) to allow quick prototyping of documents and yet have an easy interface between a requirements management tool and word processing and presentation software. These embodiments significantly reduce time and expenses/costs associated with document production, handling, and processing. A systems engineering project, for example, can be for certain code names/numbers, contract names/numbers, or the projects arranged in a project tree 152, 158 (see FIGS. 11-13). By accessing the open-door or open-window icon, various project documents can be accessed through module trees 154 in a project document. The tool bars 156, 176, for example, can include open, such as open-door or open window, close, such as with large X, view or browse, such as a magnifying glass icon, a document assemble, create, or convert icon, and add node plus sign to add node to one or more of the various trees, and plus and/or minus signs to add or save documents to the database or to delete documents as desired. For example, FIG. 15 illustrates a window 200 or user interface being opened to add a node as specified or described 202, 204.

Embodiments of a system 30, 100, 110, for example, also can include a second document converter, either separately or as a portion of the first document converter, responsive to the document prototype creating software to convert the new systems engineering prototype document having the new systems engineering prototype document format into a reformatted systems engineering prototype document having the subset of the plurality of sections in the predetermined word processing format. The system 30, 100, 110 can also include storage requesting means, e.g., provided by software commands through selection of icons, such as plus or minus icons of the tool bar 176, by a user on a graphical user interface 150, 170, 200, 210, 220, 230 as understood by those skilled in the art, responsive to the user through the user interface and in communication with the first document converter for requesting storage of the new systems engineering prototype document having the new systems engineering prototype document format in a preselected storage location, e.g., a database or memory, prior to being converted back to the predetermined word processing document format for later retrieval and for requesting storage of the reformatted systems engineering prototype document into the database 90, 119 and to add to the database 90, 119.

The system 30, 100, 110 can additionally include a document section controller or processor 61 in communication with the user interface and the document section selector to control access to the subset or subsections 91 of each of the plurality of document sections so that access to a selected section is limited to a selected user to make changes to the selected section and yet allow other selected users also to have access to the other selected sections of the subset to make changes thereto substantially simultaneous to the selected user. Security or access, for example, can be controlled through a user interface 190 having instructions for login requirements 192 and password requirements 194 as understood by those skilled in the art (see FIG. 14).

Embodiments of a system 30, 100, 110 can further include a remote third party interface, e.g., client user, client servelet, or other third party preferably having security access rights, responsive to the reformatted systems engineering prototype document format to the remote third party. The preselected systems engineering document format, for example, can include a preselected module tree 154 positioned to have the plurality of documents sections each viewable to the user through the user interface 150 by a preselected node in the preselected module tree 154. As understood by those skilled in the art, the preselected module tree 154 includes a plurality of nodes, e.g., air vehicle, and a plurality of subnodes, e.g., scope, applicable documents, organized under each of the plurality of nodes. Each of the plurality of subnodes has text viewable to a user through the user interface. Embodiments of a system 30, 100, 110 can still further include a system engineering management requirements interface in communication with the document prototyping software 50 to add document prototype requirements prior to merging of the subset of document sections so that the new systems engineering prototype document includes the newly added or updated document prototype requirements.

As illustrated in FIGS. 1-22, the present invention also provides embodiments of a computer-readable recording medium or media storing therein a systems engineering document prototyping program to allow a user to create prototype documents. Such a computer-readable recording medium or media, for example, can be a compact disc, magnetic disc, read only memory, and various other read and/or write type memory devices as understood by those skilled in the art. Other examples of computer readable media, as understood by those skilled in the art, include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. The systems engineering document prototyping program 50 can include a document browser 52 adapted to browse through a user interface a plurality of systems engineering document templates stored in a database 90, 119. Each of the plurality of systems engineering document templates 95 includes a plurality of document sections 91. The program also includes a document section selector 56 adapted to select a subset of the plurality of document sections from the plurality of systems engineering document templates 53, 95 in the database 90 responsive to a user using the user interface 60, and a document section merger 57 responsive to the document section selector 56 to merge the selected sections into a new systems engineering prototype document having the subset of the plurality of document sections to thereby define a new systems engineering prototype document format.

As also illustrated in FIGS. 1-22, the present invention further provides embodiments of methods of creating a systems engineering prototype document. An embodiment of a method includes adding a plurality of original systems engineering document templates 53, 95 each having a plurality of document sections 91 to a database 90, 119 (block 130), browsing the plurality of systems engineering templates 95 and/or template sections 224 stored in the database 90, 119, selecting one or more of the plurality of templates 220 from a template list 172, and selecting a subset of the plurality of document sections from the plurality of systems engineering document templates 95 (block 141) stored in the database 90, 119 responsive to a user.

Figure 17:
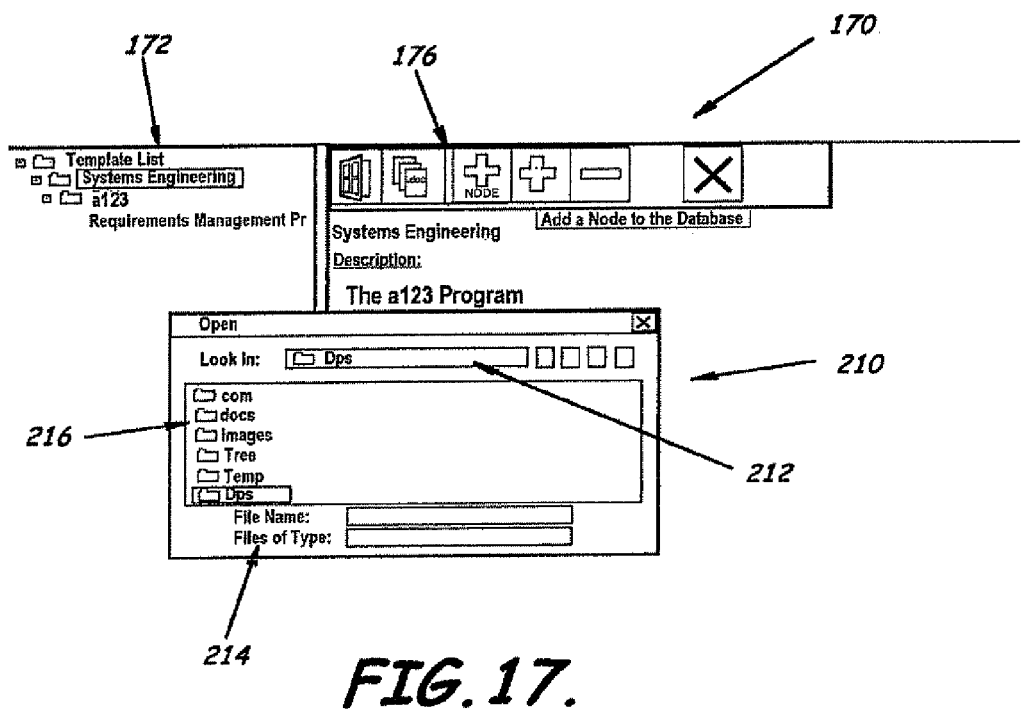
FIG. 17 is a front plan view of a graphical user interface of a system to create a system engineering document prototype according to an embodiment of the present invention.
Figure 18:
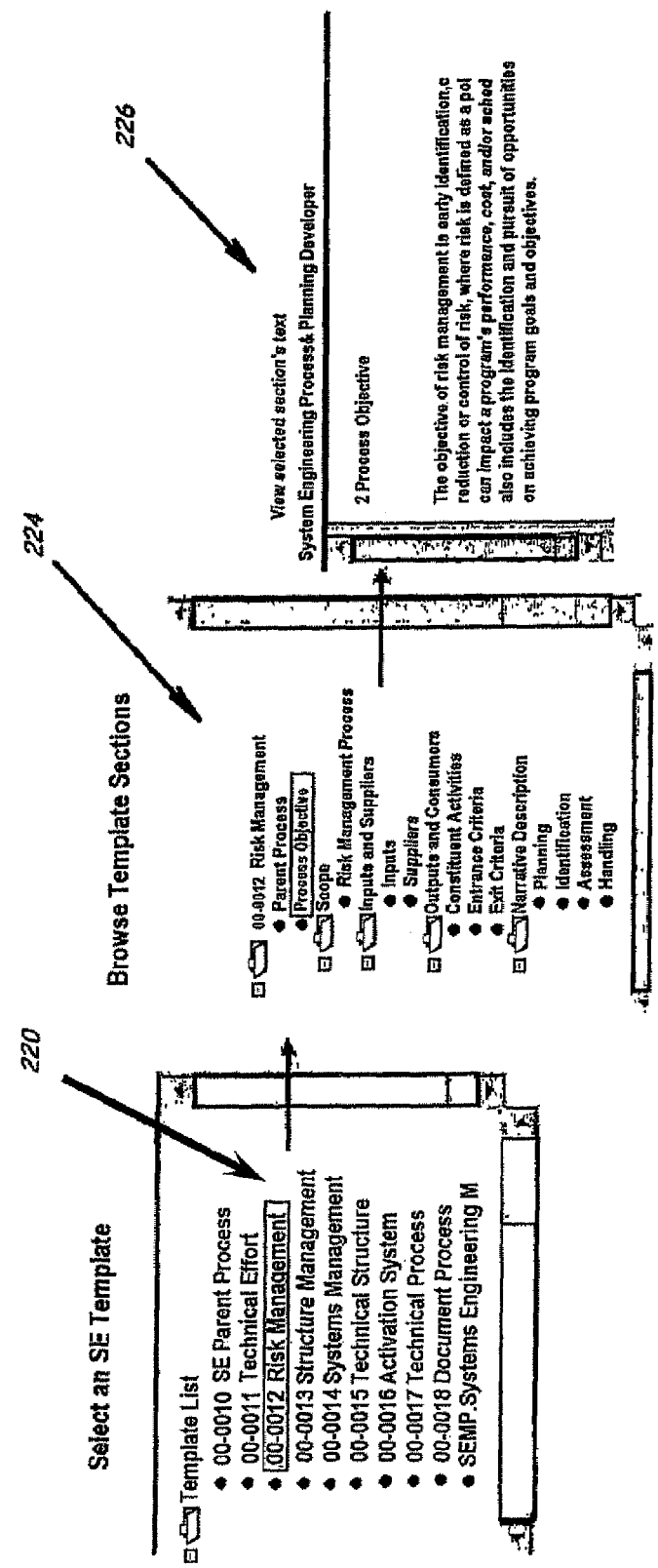
FIG. 18 is a front plan view of a graphical user interface of a system to create a system engineering document prototype according to an embodiment of the present invention.
Figure 19:
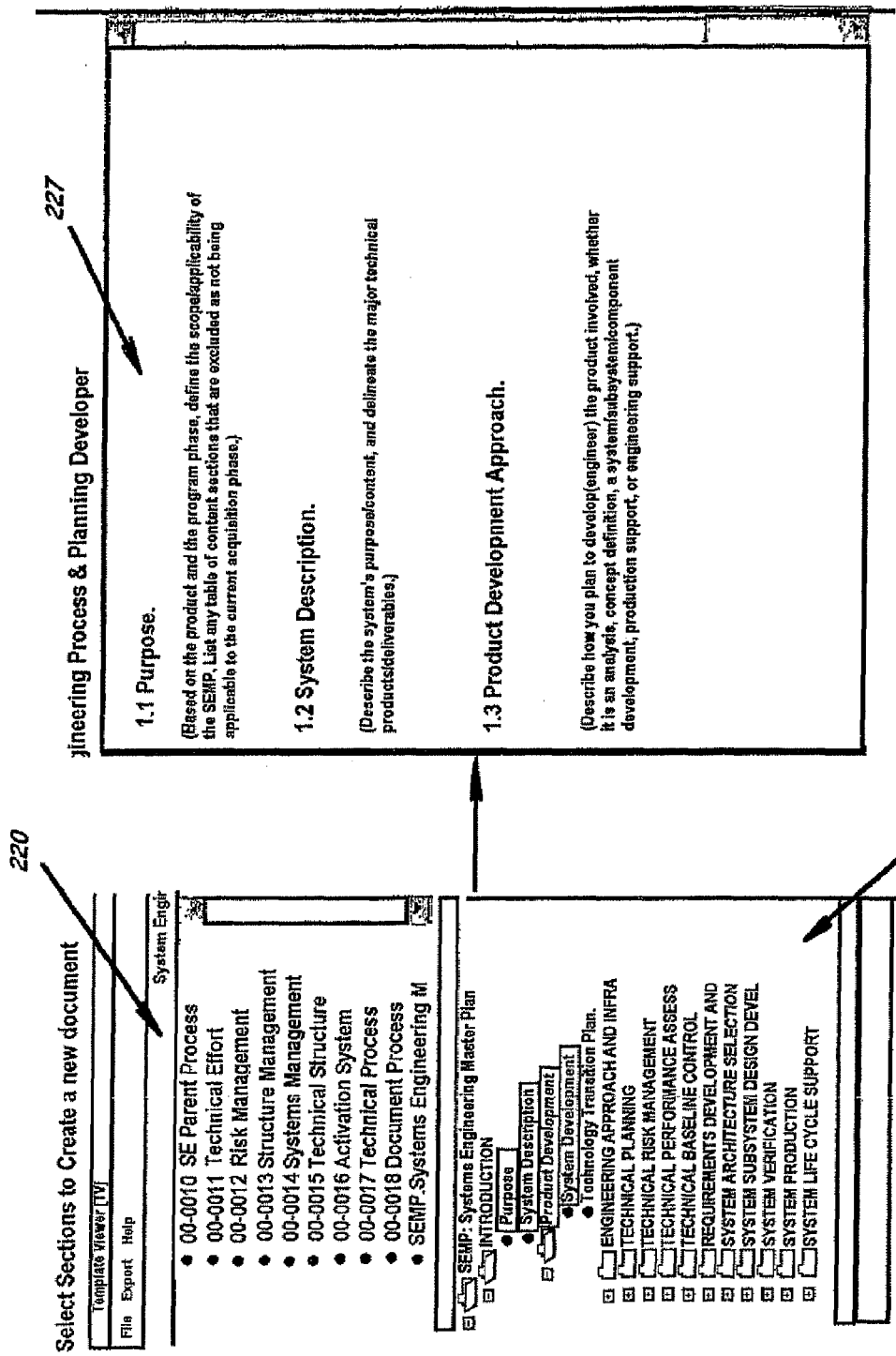
FIG. 19 is a front plan view of a graphical user interface of a system to create a system engineering document prototype according to an embodiment of the present invention.
Figure 20:
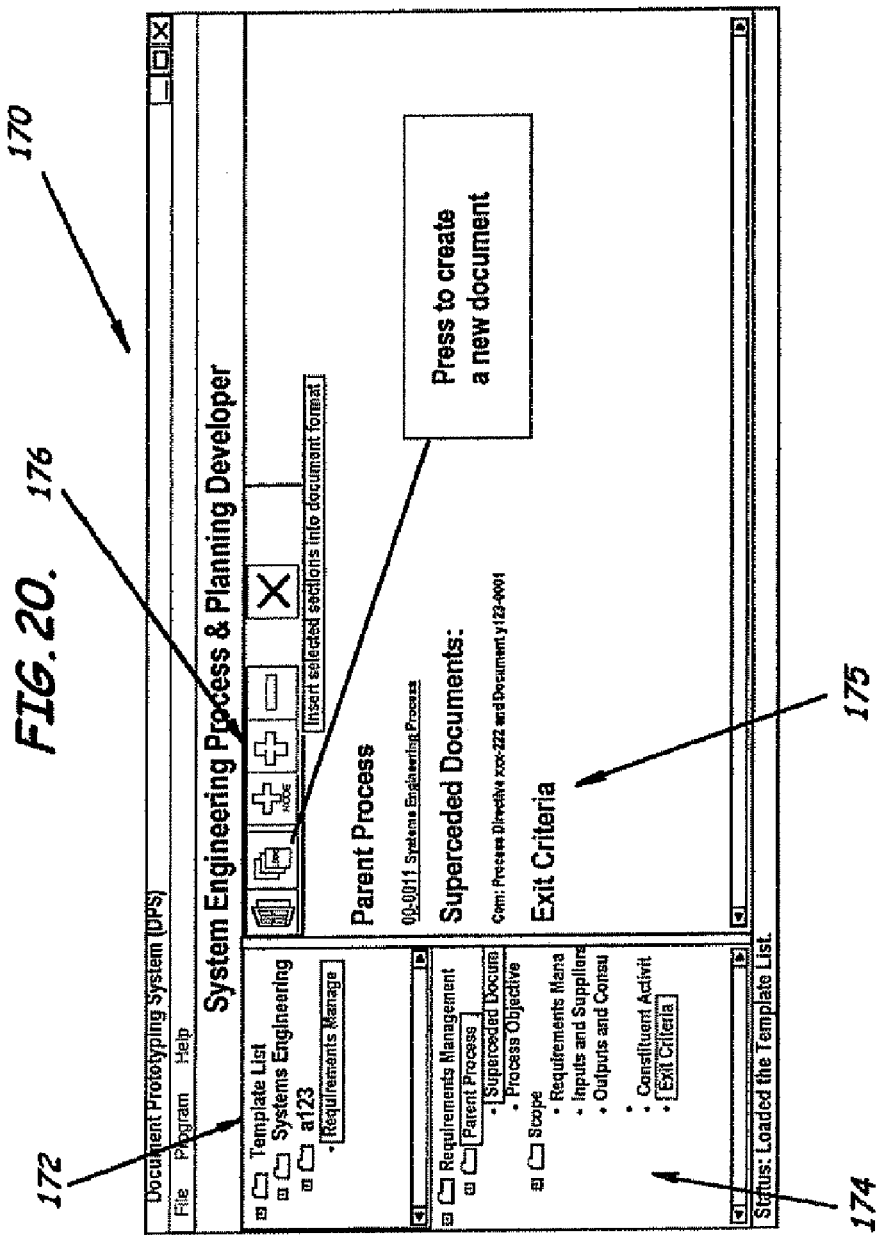
FIG. 20 is a front plan view of a graphical user interface of a system to create a system engineering document prototype according to an embodiment of the present invention.
Figure 21:
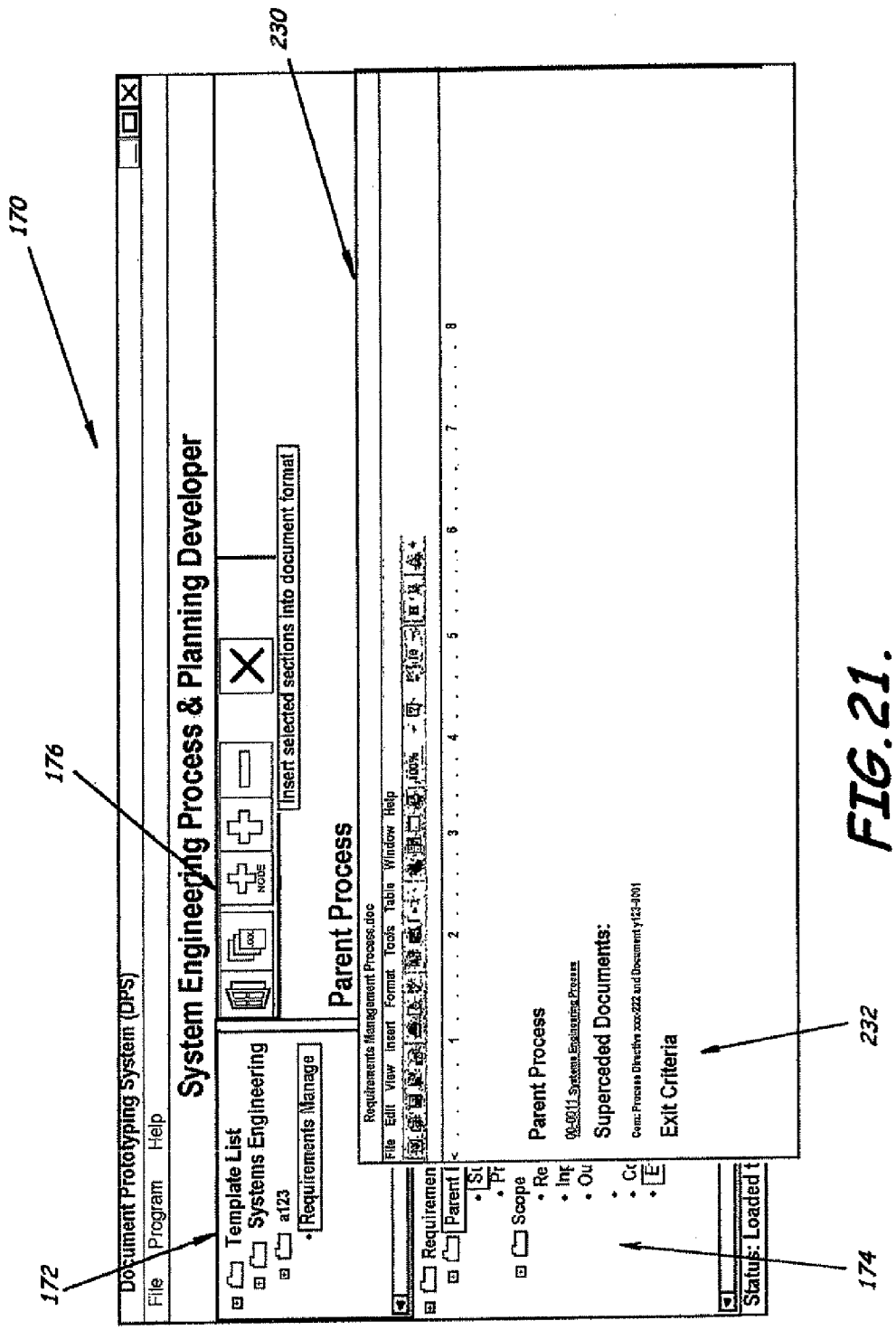
FIG. 21 is a front plan view of a graphical user interface of a system to create a system engineering document prototype according to an embodiment of the present invention.
Figure 22:
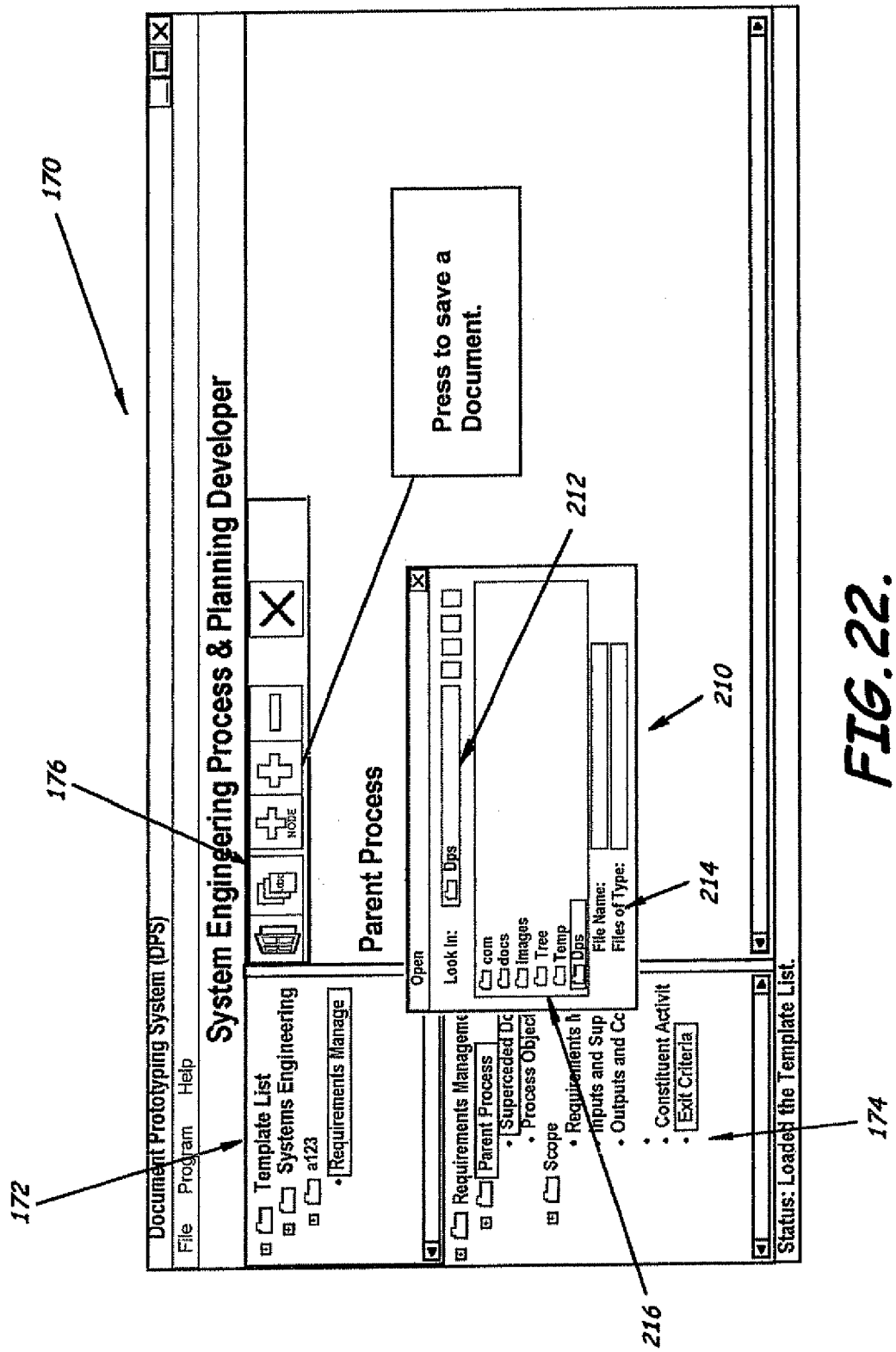
FIG. 22 is a front plan view of a graphical user interface of a system to create a system engineering document prototype according to an embodiment of the present invention.

The method can additionally include creating a new document such as by initiating a document creation sequence by clicking on an icon to open a window 210, selecting from a plurality of files 216 a document prototype software creation or access file 212, 214, and arranging a subset of the plurality of sections 225 into a desired or preferred configuration (block 142) to form a new systems engineering prototype document having the subset of the plurality of document sections to thereby define a new systems engineering prototype document format 227 (see also FIGS. 17-19). The method can also include storing or adding the new systems engineering prototype document format in a database 90, 119. The browsing step can include the step of a user viewing text 226 of the plurality of document sections of the plurality of systems engineering document templates 53, 95, from a template list, e.g., 172, and the selecting step can include the step of merging the selected subset of the plurality of document sections (block 143) into or converting into the new systems engineering prototype document format (block 144). The method, for example, can further include forming an interface to provide access to the new systems engineering prototype document from a client so that a client can make a call for the document prototyping system or software to the server via HTTP or web-based link (block 140) as understood by those skilled in the art.

Another embodiment of a method of creating a systems engineering prototype document includes providing a plurality of original systems engineering document templates each having a plurality of document sections in a database 90, 119, browsing the plurality of systems engineering templates stored in the database 90, 119, such as in a document viewer or viewing window 175, 232, selecting a subset of the plurality of document sections from the plurality of systems engineering document templates stored in the database 90, 119 responsive to a user to form a new systems engineering prototype document having the subset of the plurality of document sections to thereby define a new systems engineering prototype document format, and merging the selected subset of the plurality of document sections into the new systems engineering prototype document format to form a new systems engineering prototype document having the subset of the plurality of document sections to thereby define a new systems engineering prototype document format.

As illustrated and described herein, embodiments of the present invention advantageously provide a system 30, 110, software 50, and methods to significantly enhance rapid prototyping and development of specifications, proposals, and systems engineering documents. Embodiments of the present invention additionally provide a document prototyping and development system 30, 110 that includes a storage source for historical data and document templates. Embodiments of the present invention also advantageously provide a system 30, 110, software or program product 50, and methods to enhance document developments to be stored and tracked on a common data source and an ability to link and interface to selected product data. Embodiments of the present invention further advantageously provides a system 30, 110, software 50, and methods that allow easy controlled access to multiple users when drafting and revising a prototype document. This, for example, can allow multiple users to work on a prototype document simultaneously or substantially simultaneously and yet be restricted, e.g., through a secure link, to only selected sections of a document. Embodiments of the present invention still further provide a system, software or program product, and methods to significantly reduce the time and cost associated with document production, handling, and processing.

Although the present invention is particularly advantageous for system engineering documents and has unique features and advantages associated therewith, those skilled in the art also will understand that the document prototyping system 30, 110, software or program product 50, and methods of embodiments of the present invention can also be used for various other applications as well.

In the drawings and specification, there have been disclosed illustrated embodiments of the invention and, although specific terms are employed, they are used in a generic and descriptive sense only and not for the purpose of limitation, the scope of the invention being set forth in the following claims.

The invention claimed is:

1. A document prototyping system to create a systems engineering prototype document, the system comprising:
    a first document converter positioned to convert a plurality of word processing documents each having a predetermined word processing plain text document format into a plurality of documents each having a standard generalized markup language (SGML) format;
    a document parser positioned to parse the plurality of documents each having the SGML format into a plurality of systems engineering document templates each having a preselected systems engineering document format and a plurality of document sections;
    a systems engineering document format database positioned to store the plurality of systems engineering document templates therein;
    a user interface in communication with the systems engineering document format database to provide access to each of the plurality of systems engineering documents templates stored in the database by a user;
    document prototyping program product stored in computer-memory and in communication with the database and the user interface to create a prototype document, the document prototyping program product including a set of instructions capable of being executed by a computer to perform the following operations:
        browsing the plurality of systems engineering document templates through the user interface,
        selecting a subset of the plurality of document sections from the plurality of systems engineering document templates responsive to the user, and
        merging the selected sections into a new systems engineering prototype document having the subset of the plurality of document sections to thereby define a new systems engineering prototype document format; and
    a second document converter responsive to the document prototype creating software to convert the new systems engineering prototype document having the new systems engineering prototype document format into a reformatted systems engineering prototype document having the subset of the plurality of sections in the predetermined word processing plain text format.

2. A system as defined in claim 1, further comprising storage requesting means responsive to the user through the user interface and in communication with the first document converter for requesting storage of the new systems engineering prototype document having the new systems engineering prototype document format in a preselected storage location prior to being converted back to the predetermined word processing plain text document format for later retrieval and for requesting storage of the reformatted systems engineering prototype document into the database to add to the database.

3. A system as defined in claim 2, further comprising a document section controller in communication with the user interface and the document section selector to control access to the subset of each of the plurality of document sections so that access to a selected section is limited to a selected user to make changes to the selected section and yet allow other selected users also to have access to the other selected sections of the subset to make changes thereto substantially simultaneous to the selected user.

4. A system as defined in claim 2, further comprising a remote third party interface responsive to the reformatted systems engineering prototype document format to the remote third party, and wherein the preselected systems engineering document format includes a preselected module tree positioned to have the plurality of documents sections each viewable to the user though the user interface by a preselected node in the preselected module tree.

5. A system as defined in claim 4, wherein the preselected module tree includes a plurality of nodes and a plurality of subnodes organized under each of the plurality of nodes, each of the plurality of subnodes having text viewable to a user through the user interface.

6. A system as defined in claim 1, further comprising a system engineering management requirements interface in communication with the document prototyping program product to add document prototype requirements prior to merging of the subset of document sections so that the new systems engineering prototype document includes the added document prototype requirements.

7. A document prototyping system to create a systems engineering prototype document, the system comprising:
    a first document converter positioned to convert a plurality of word processing documents each having a predetermined word processing plain text document format into a plurality of documents each having a standard generalized markup language (SGML) format;
    a document parser positioned to parse the plurality of documents each having the SGML format into a plurality of systems engineering document templates each having a preselected systems engineering document format and a plurality of document sections;
    a systems engineering document format database positioned to store the plurality of systems engineering document templates therein;
    a user interface in communication with the systems engineering document format database to provide access to each of the plurality of systems engineering document templates stored in the database by a user, the preselected systems engineering document format also including a preselected module tree positioned to have the plurality of documents sections each viewable to the user through the user interface by a preselected node in the preselected module tree;
    document prototyping program product stored in computer memory and in communication with the database and the user interface to create a prototype document, the document prototyping program product including a set of instructions capable of being executed by a computer to perform the following operations:
        browsing the plurality of systems engineering document templates through the user interface,
        selecting a subset of the plurality of document sections from the plurality of systems engineering document templates responsive to the user, and merging the selected sections into a new systems engineering prototype document having the subset of the plurality of document sections to thereby define a new systems engineering prototype document format;

a second document converter responsive to the document prototype creating software to convert the new systems engineering prototype document having the new systems engineering prototype document format into a reformatted systems engineering prototype document having the subset of the plurality of sections in the predetermined word processing plain text format;

a storage requester responsive to the user through the user interface and in communication with the first document converter to request storage of the new systems engineering prototype document having the new systems engineering prototype document format in a preselected storage location prior to being converted back to the predetermined word processing plain text document format for later retrieval and for requesting storage of the reformatted systems engineering prototype document into the database to add to the database; and a remote third party interface responsive to the reformatted systems engineering prototype document format to the remote third party.

8. A system as defined in claim 7, further comprising a document section controller in communication with the user interface and the document section selector to control access to the subset of each of the plurality of document sections so that access to a selected section is limited to a selected user to make changes to the selected section and yet allow other selected users also to have access to the other selected sections of the subset to make changes thereto substantially simultaneous to the selected user.

9. A system as defined in claim 8, further comprising a remote third party interface responsive to the reformatted systems engineering prototype document format to the remote third party, and wherein the preselected systems engineering document format includes a preselected module tree positioned to have the plurality of documents sections each viewable to the user through the user interface by a preselected node in the preselected module tree.

10. A system as defined in claim 9, wherein the preselected module tree includes a plurality of nodes and a plurality of subnodes organized under each of the plurality of nodes, each of the plurality of subnodes having text viewable to a user through the user interface.

11. A system as defined in claim 7, further comprising a system engineering management requirements interface in communication with the document prototyping program product to add document prototype requirements prior to merging of the subset of document sections so that the new systems engineering prototype document includes the added document prototype requirements.

* * * * *